United States Patent
Victory et al.

(10) Patent No.: US 11,816,405 B2
(45) Date of Patent: *Nov. 14, 2023

(54) SYSTEMS AND METHODS FOR DESIGNING A MODULE SEMICONDUCTOR PRODUCT

(71) Applicant: SEMICONDUCTOR COMPONENTS INDUSTRIES, LLC, Phoenix, AZ (US)

(72) Inventors: James Joseph Victory, Trabuco Canyon, CA (US); Klaus Neumaier, Erding (DE); YunPeng Xiao, Shanghai (CN); Jonathan Harper, Munich (DE); Vaclav Valenta, Brno (CZ); Stanley Benczkowski, Bear Creek Township, PA (US); Thierry Bordignon, Toulouse (FR); Wai Lun Chu, Kowloon (HK)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,081

(22) Filed: Sep. 7, 2022

(65) Prior Publication Data

US 2023/0004699 A1    Jan. 5, 2023

Related U.S. Application Data

(63) Continuation of application No. 17/076,072, filed on Oct. 21, 2020, now Pat. No. 11,481,533.

(Continued)

(51) Int. Cl.
G06F 30/31 (2020.01)
G06F 30/367 (2020.01)

(Continued)

(52) U.S. Cl.
CPC ............ G06F 30/31 (2020.01); G06F 30/367 (2020.01); G06F 30/392 (2020.01);
(Continued)

(58) Field of Classification Search
CPC ....................................................... G06F 30/31
(Continued)

(56) References Cited

U.S. PATENT DOCUMENTS

| 2007/0250800 | A1* | 10/2007 | Keswick | .................. | G06F 30/30 |
| | | | | | 716/139 |
| 2013/0033277 | A1* | 2/2013 | Liao | ...................... | G06F 30/367 |
| | | | | | 324/750.03 |
| 2020/0042664 | A1 | 2/2020 | Lee et al. | | |

OTHER PUBLICATIONS

Hampton, L., CAE Workstations and Semicustom IC Vendors Offer Increased Design Flexibility, IEEE Circuits and Devices Magazine, Jul. 1986, pp. 32-35.

(Continued)

*Primary Examiner* — Eric D Lee
(74) *Attorney, Agent, or Firm* — Adam R. Stephenson, LTD.

(57) ABSTRACT

Implementations of a method of designing a module semiconductor product may include receiving a selection of a module type, one or more die, a placement of one or more wires, clips, or pins; and generating, using a processor, a module configuration file. The method may include generating a module bonding diagram using a build diagram system module; selecting one or more SPICE models corresponding with the die; and generating a product SPICE model and a three dimensional model for the module semiconductor product. The method may include generating one or more datasheet characteristics of the module semiconductor product with at least the product SPICE model and the product simulation module, generating a product datasheet for the module semiconductor product using the
(Continued)

datasheet formation module, and providing access to at least the module bonding diagram, the product SPICE model, the three dimensional model, and the product datasheet to the user.

20 Claims, 12 Drawing Sheets

Related U.S. Application Data

(60) Provisional application No. 62/923,615, filed on Oct. 21, 2019.

(51) Int. Cl.
*G06F 30/392* (2020.01)
*G06F 30/398* (2020.01)
*G06N 3/04* (2023.01)
*G06N 3/08* (2023.01)
*G06F 119/08* (2020.01)
*G06F 111/02* (2020.01)
*G06F 117/12* (2020.01)

(52) U.S. Cl.
CPC .............. *G06F 30/398* (2020.01); *G06N 3/04* (2013.01); *G06N 3/08* (2013.01); *G06F 2111/02* (2020.01); *G06F 2117/12* (2020.01); *G06F 2119/08* (2020.01)

(58) Field of Classification Search
USPC ......................................................... 716/138
See application file for complete search history.

(56) References Cited

OTHER PUBLICATIONS

He, C., et al., A Physically Based Scalable SPICE Model for Silicon Carbide Power MOSFETs, IEEE, 2017, pp. 2678-2684.

* cited by examiner

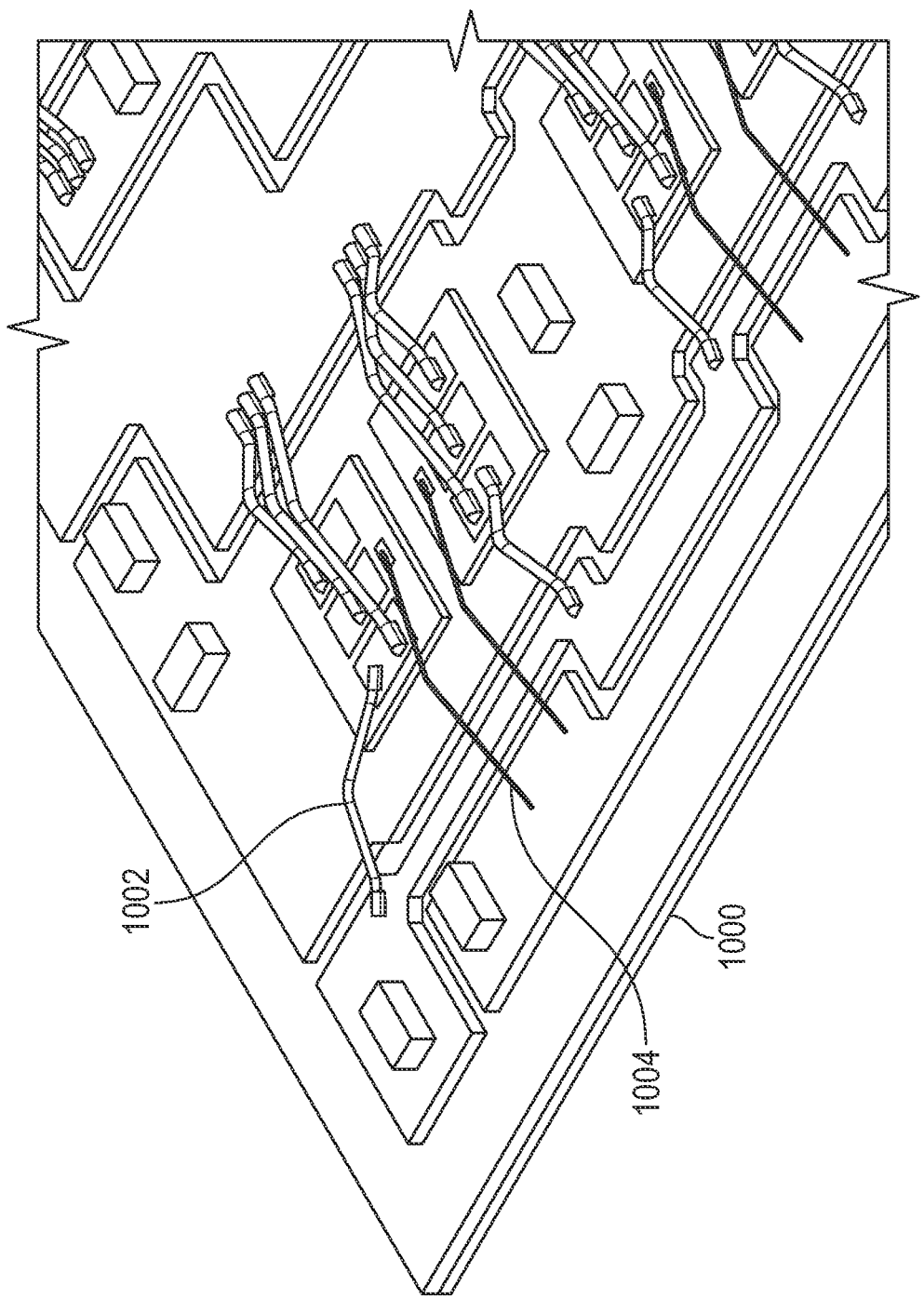

SYSTEMS AND METHODS FOR DESIGNING A MODULE SEMICONDUCTOR PRODUCT

CROSS REFERENCE TO RELATED APPLICATIONS

This application is a continuation application of the earlier U.S. Utility Patent application to Victory et al. entitled "Systems and Methods for Designing a Module Semiconductor Product," application Ser. No. 17/076,072, filed Oct. 21, 2020, which application claims the benefit of the filing date of U.S. Provisional Patent Application 62/923,615, entitled "System, Apparatus, and Methods for Custom and/or Automated Design of Semiconductor Devices" to Victory et al. which was filed on Oct. 21, 2019, the disclosures of each of which are hereby incorporated entirely herein by reference.

TECHNICAL FIELD

Aspects of this document relate generally to systems and methods, such as systems and methods for designing a discrete device product. More specific implementations involve systems and methods for automated electronic component design.

BACKGROUND

Electronic components include a wide variety of devices including transistors, resistors, capacitors, and other devices designed to manipulate/control electrical charge. Microprocessors include various electronic components assembled on a single integrated circuit design that are capable of performing various analog or digital calculations.

SUMMARY

Implementations of a system configured for designing a module semiconductor product, the system may include one or more hardware processors configured by machine-readable instructions to: use a first interface generated by a computing device to receive from a user a selection of a module type; use a first interface generated by a computing device to receive from a user a selection of one or more die; and use a first interface generated by a computing device to receive from a user a placement of one or more wires, one or more clips, or one or more pins. The one or more hardware processors may be configured to generate, using a processor, a module configuration file; generate, using a processor, a module bonding diagram using a build diagram system module with the module configuration file; select, using a processor, one or more SPICE models corresponding with the one or more die; and provide, using a processor, the module configuration file, the module bonding diagram, and the one or more SPICE models to a three dimensional simulation module. The one or more hardware processors may be configured to generate, using a processor, a product SPICE model and a three dimensional model for the module semiconductor product using the three dimensional simulation module; provide, using a processor, at least the product SPICE model to a product simulation module; generate, using a processor, one or more datasheet characteristics of the module semiconductor product with at least the product SPICE model and the product simulation module; and provide, using a processor, the one or more datasheet characteristics to a datasheet formation module. The one or more hardware processors may be configured to generate, using a processor, a product datasheet for the module semiconductor product using the datasheet formation module with at least the module configuration file, the module bonding diagram, and the one or more datasheet characteristics; and provide access to at least the module bonding diagram, the product SPICE model, the three dimensional model, and the product datasheet to the user by generating a second interface with the computing device.

Implementations of a system configured for designing a module semiconductor product may include one, all, or any of the following:

The product SPICE model may include die SPICE models, a module parasitic extraction model, and a thermal model.

The one or more die may be power semiconductor die.

The module configuration file may be a Java Script Object Notation file.

The three dimensional simulation module may use a finite element modeling process to generate the product SPICE model of the module semiconductor product.

The system may be configured to, after receiving from the user the selection of one or more die, retrieve a die SPICE model from a die SPICE modeling system.

The system may be configured to, after receiving from the user the selection of one or more wires, use a processor to use one or more design rules to generate flight lines for the one or more wires in the first interface.

The system may be configured to, after receiving from the user the selection of one or more pins, use a processor to indicate an acceptable location for the one or more pins in the first interface.

The system may be configured to use a plurality of bonding design rules with the module configuration file.

The system may be configured to provide access to a module schematic diagram with the second interface.

Implementations of a method of designing a module semiconductor product may include, using a first interface generated by a computing device, receiving from a user a selection of a module type; using a first interface generated by a computing device, receiving from a user a selection of one or more die; using a first interface generated by a computing device, receiving from a user a placement of one or more wires, one or more clips, or one or more pins; and generating, using a processor, a module configuration file. The method may include generating, using a processor, a module bonding diagram using a build diagram system module with the module configuration file; selecting, using a processor, one or more SPICE models corresponding with the one or more die; providing, using a processor, the module configuration file, the module bonding diagram, and the one or more SPICE models to a three dimensional simulation module; and generating, using a processor, a product SPICE model and a three dimensional model for the module semiconductor product using the three dimensional simulation module. The method may include providing, using a processor, at least the product SPICE model to a product simulation module; generating, using a processor, one or more datasheet characteristics of the module semiconductor product with at least the product SPICE model and the product simulation module; providing, using a processor, the one or more datasheet characteristics to a datasheet formation module; generating, using a processor, a product datasheet for the module semiconductor product using the datasheet formation module with at least the module configuration file, the module bonding diagram, and the one or more datasheet characteristics; and providing access to at least the module bonding diagram, the product SPICE model, the three dimensional model, and the product datasheet to the user by generating a second interface with the computing device.

Implementations of a method of designing a module semiconductor product may include one, all, or any of the following: the The product SPICE model may include die SPICE models, a module parasitic extraction model, and a thermal model.

The one or more die may be power semiconductor die.

The module configuration file may be a Java Script Object Notation file.

The three dimensional simulation module uses a finite element modeling process to generate the product SPICE model of the module semiconductor product.

Receiving from the user the selection of one or more die further may include retrieving a die SPICE model from a die SPICE modeling system.

The receiving from the user the selection of one or more wires further may include, using a processor, using one or more design rules to generate flight lines for the one or more wires in the first interface.

The receiving from the user the selection of one or more pins further may include, using a processor, indicating an acceptable location for the one or more pins in the first interface.

Generating, using the processor, the module bonding diagram using the build diagram system module may further include using a plurality of bonding design rules with the module configuration file.

Providing access to at least the module bonding diagram, the product SPICE model, the three dimensional model, and the product datasheet to the user by generating the second interface with the computing device may further include providing access to a module schematic diagram.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 11 illustrates a detailed view of an implementation of a three-dimensional model illustrating wire placement and wire sizes in the model.

DETAILED DESCRIPTION

This disclosure, its aspects and implementations, are not limited to the specific components, assembly procedures or method elements disclosed herein. Many additional components, assembly procedures and/or method elements known in the art consistent with the intended for designing a module semiconductor product will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for designing a module semiconductor product, and implementing components and methods, consistent with the intended operation and methods.

Figure 1:
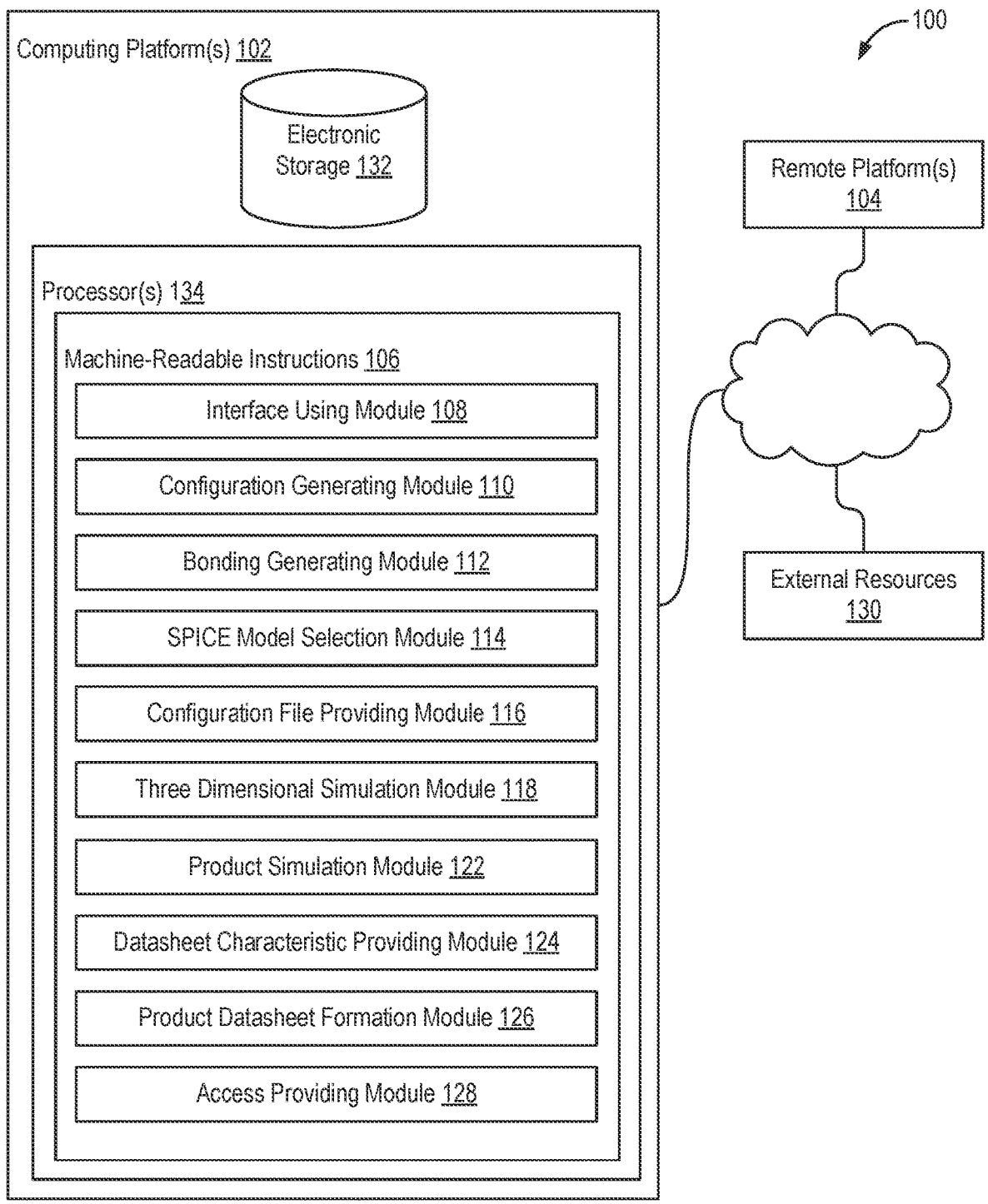
FIG. 1 illustrates an implementation of a system configured for designing a module semiconductor product.

FIG. 1 illustrates a system 100 configured for designing a module semiconductor product, in accordance with one or more implementations. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of interface using module 108, configuration generating module 110, bonding generating module 112, SPICE model selection module 114, configuration file providing module 116, three dimensional simulation module 118, product simulation module 122, datasheet characteristic providing module 124, product datasheet formation module 126, access providing module 128, and/or other instruction modules.

As described further herein, interface generating module 108 generates a first interface using a computing device in response to receiving from a user a selection of a module type. In various implementations, the module type may include one or more package configurations. A package configuration in particular implementations may include one or more lead frames and one or more direct bonded copper substrates. In various implementations, a particular package configuration may include multiple direct bonded copper substrate configurations. Following selection of a module type, interface generating module 108 generates a floorplan view of the substrate 300 of the module. Example of such a floorplan view of a module substrate is illustrated in FIG. 3.

Figure 3:
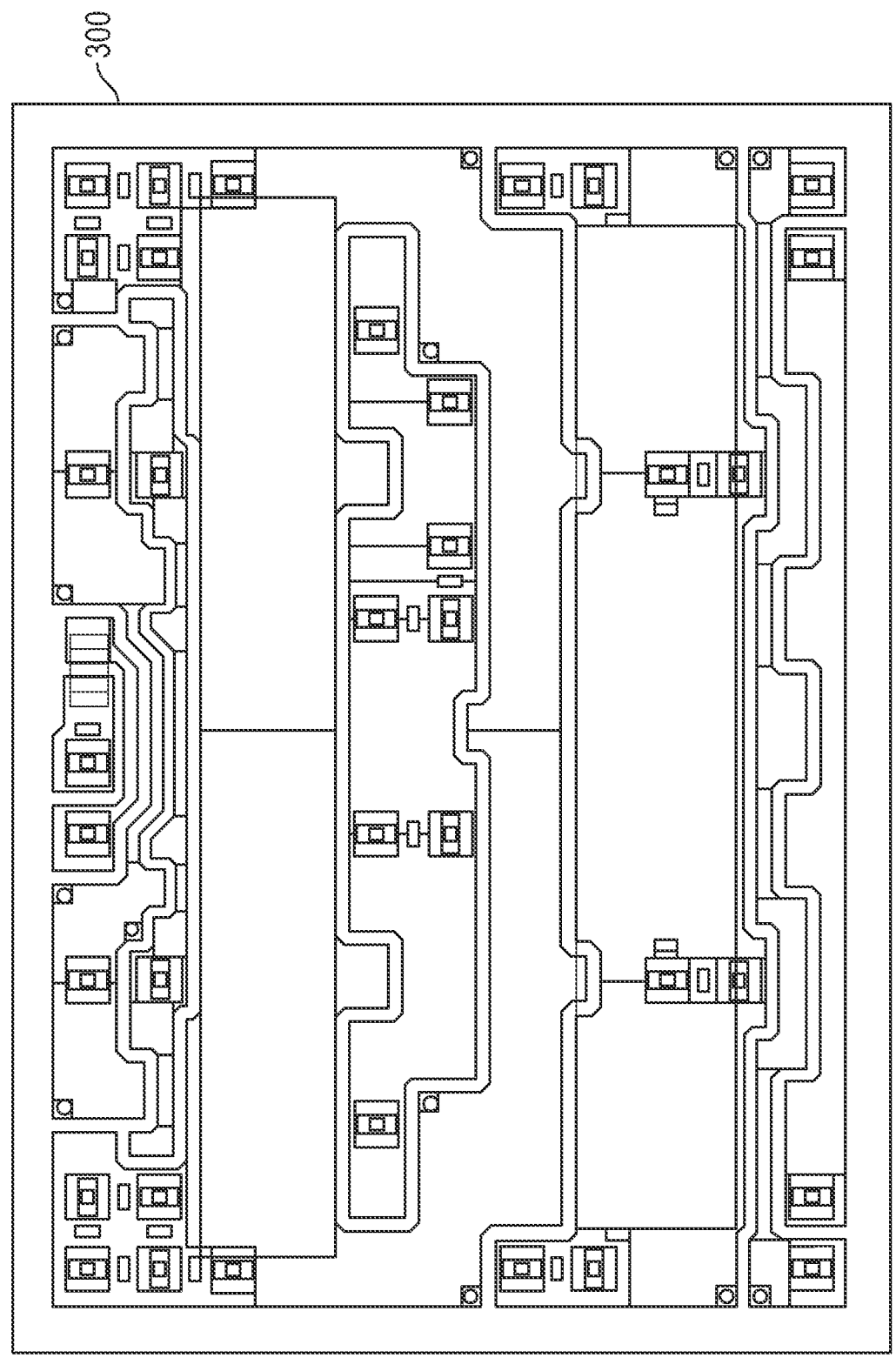
FIG. 3 illustrates a portion of a first interface that shows an initial floorplan view of a substrate for a module semiconductor product.

As illustrated in FIG. 3, the floorplan view shows routing lines formed on the surface of the substrate 300 to which die, clips, wires, and pins will subsequently be affixed. FIG. 3 also illustrates temperature sensing devices affixed to the surface of the substrate 300. In various implementations, the modules may be dual side cooling modules.

Figure 4:
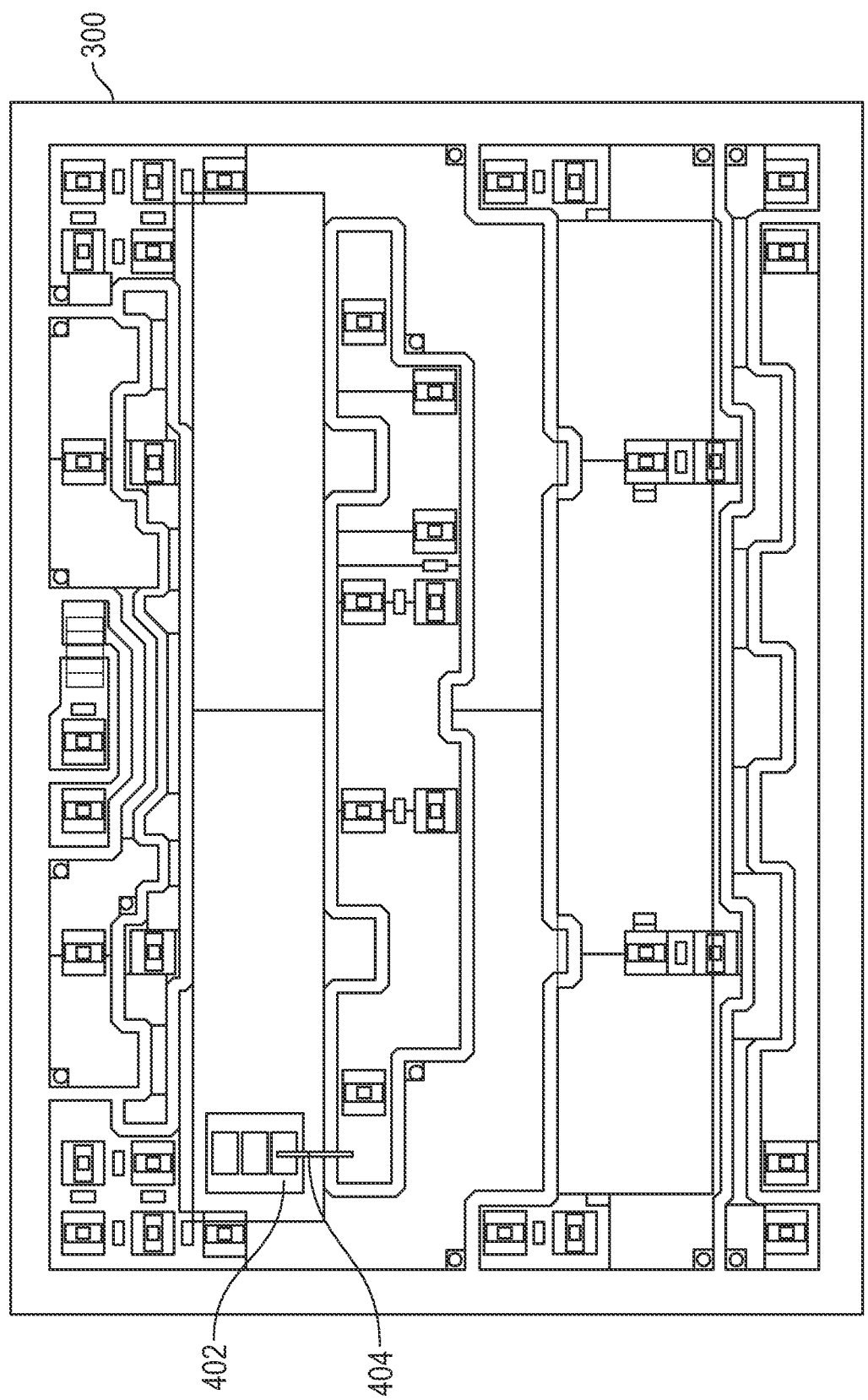
FIG. 4 illustrates a portion of a first interface that shows a floorplan view of the substrate of FIG. 3 during a wire placement operation.
Figure 6:
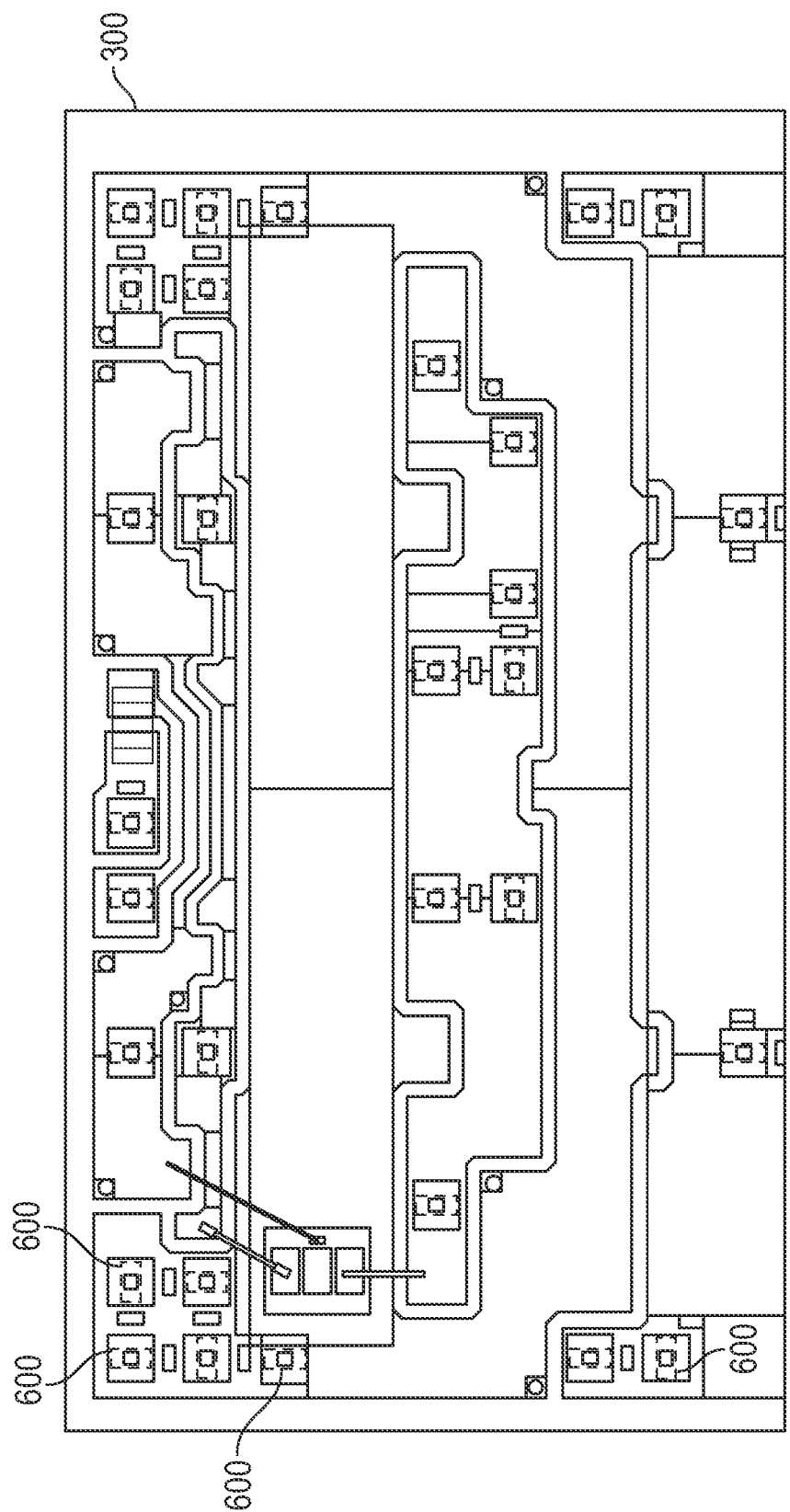
FIG. 6 illustrates a portion of a first interface that shows a floorplan view of the substrate of FIG. 3 during a pin placement operation.

Interface generating module 108 also generates a first interface using a computing device after receiving from a user a selection of one or more die. The one or more die may be power semiconductor die in various implementations; however, in other implementations in the electronic device may be used, such as, by non-limiting example, integrated circuits (IC), active devices, passive devices, components, capacitors, transistors, resistors, gate drivers, temperature sensing devices, and any other electronic component type. Interface generating module 108 generates a first interface using computing device after receiving from a user a placement of one or more wires, one or more clips, and one or more pins/terminals. In various implementations, ribbons may also be used to make connections and may also be included for placement using the first interface by the user. Referring to FIG. 4, a floorplan view of the substrate 300 is illustrated following placement of die 402 and wire 404. In various system implementations, during selection of one or more wires or one or more clips the processor may use one or more design rules to generate flight lines by highlighting various locations on the substrate 300 which are acceptable for the one or more wires or one or more clips to be placed using the first interface so that the user can determine allowed locations for placement of an end of the one or more wires. In various system implementations, during selection of one or more pins/terminals the system may use the processor to indicate an acceptable location for the one or more pins in the first interface. Referring to FIG. 6, the acceptable locations for the one or more pins/terminals may be indicated in dotted lines 600 on the substrate 300 during the pin placement portion of the process.

Figure 7:
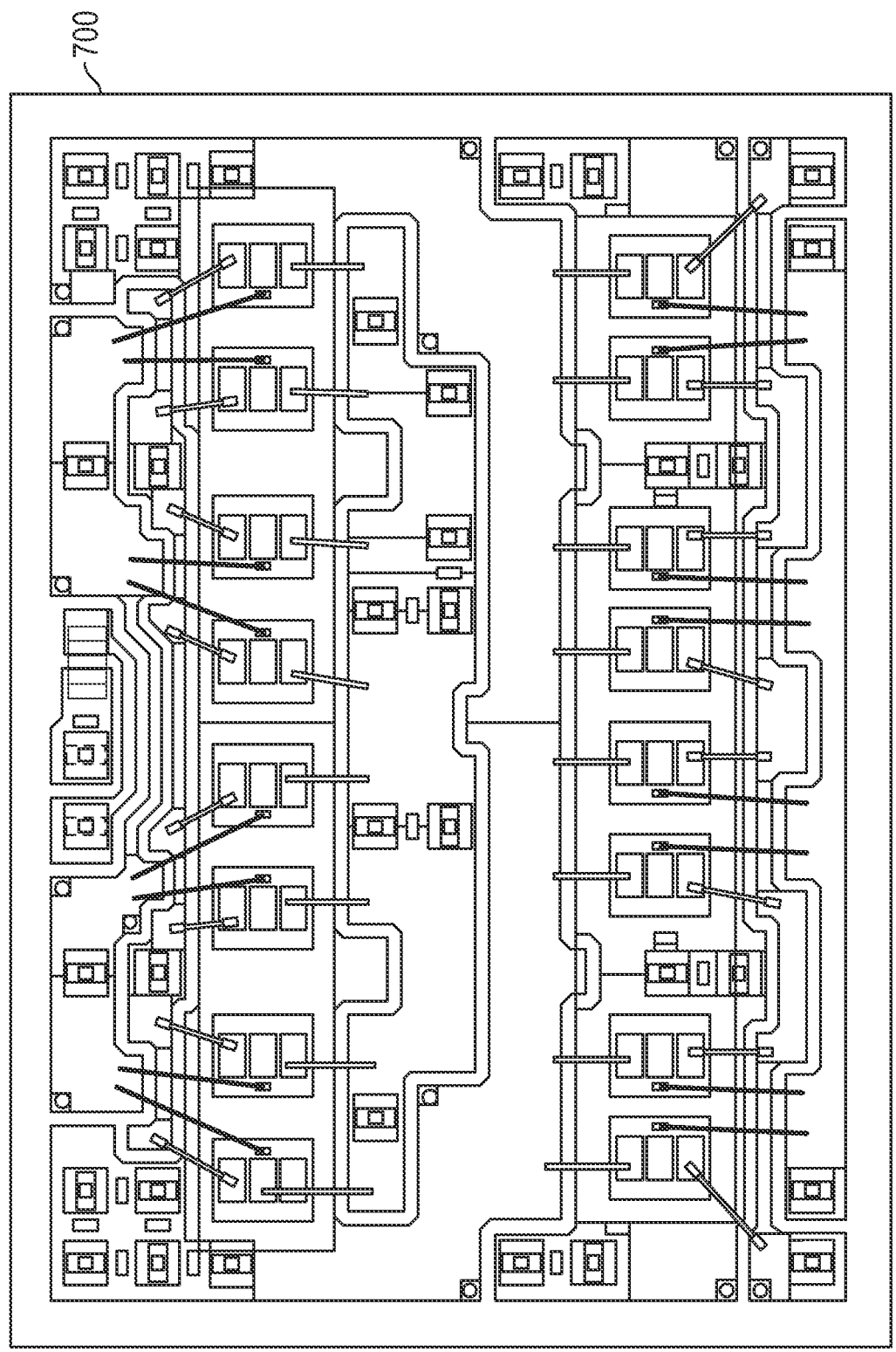
FIG. 7 illustrates a portion of a first interface that shows a floorplan view of another implementation of a substrate following die placement, wire placement, and pin placement operations.

Following placement of the pins/terminals, configuration generating module 110 generates, using a processor, a module configuration file. The module configuration file may be a Java Script Object Notation (JSON) file that, in various implementations, contains, in an ordered hierarchy, a description of the various objects and layers in which those objects are placed on the substrate. The various objects may include, by non-limiting example, ICs, die, wires, passive components, temperatures sensing devices, clips, bonding locations, routing metal lines, pins, terminals, connectors, input ports, output ports, ribbons, and any other substrate component. Referring to FIG. 7, an implementation of a first interface is illustrated following generation of the module configuration file for another substrate implementation 700. As illustrated, all the pins, wires, and die are illustrated as placed in the allowed locations as determined by implementing design rules on the substrate 700. While in the view of FIG. 7 the routing of the wiring is illustrated, this routing still needs to be formally checked and a bonding diagram suitable for further simulation and ultimate use with wire bonders in production. In various implementations, the configuration generating module 110 may, during the generation process, using design rule checker invalidate the placement of all the components on the substrate 700. In particular implementations, the reliability rule checker may also be implemented either in combination with the desirable checker or on its own. The reliability rule checker may utilize various reliability rules developed in addition to the design rules to ensure that various process marginalities identified as risks to reliability are avoided in the design. For example, a reliability rule may specify the proportions of current need to be carried by adjacent wires to ensure no wire melts or is bonded to any other wire by heat.

Figure 5:
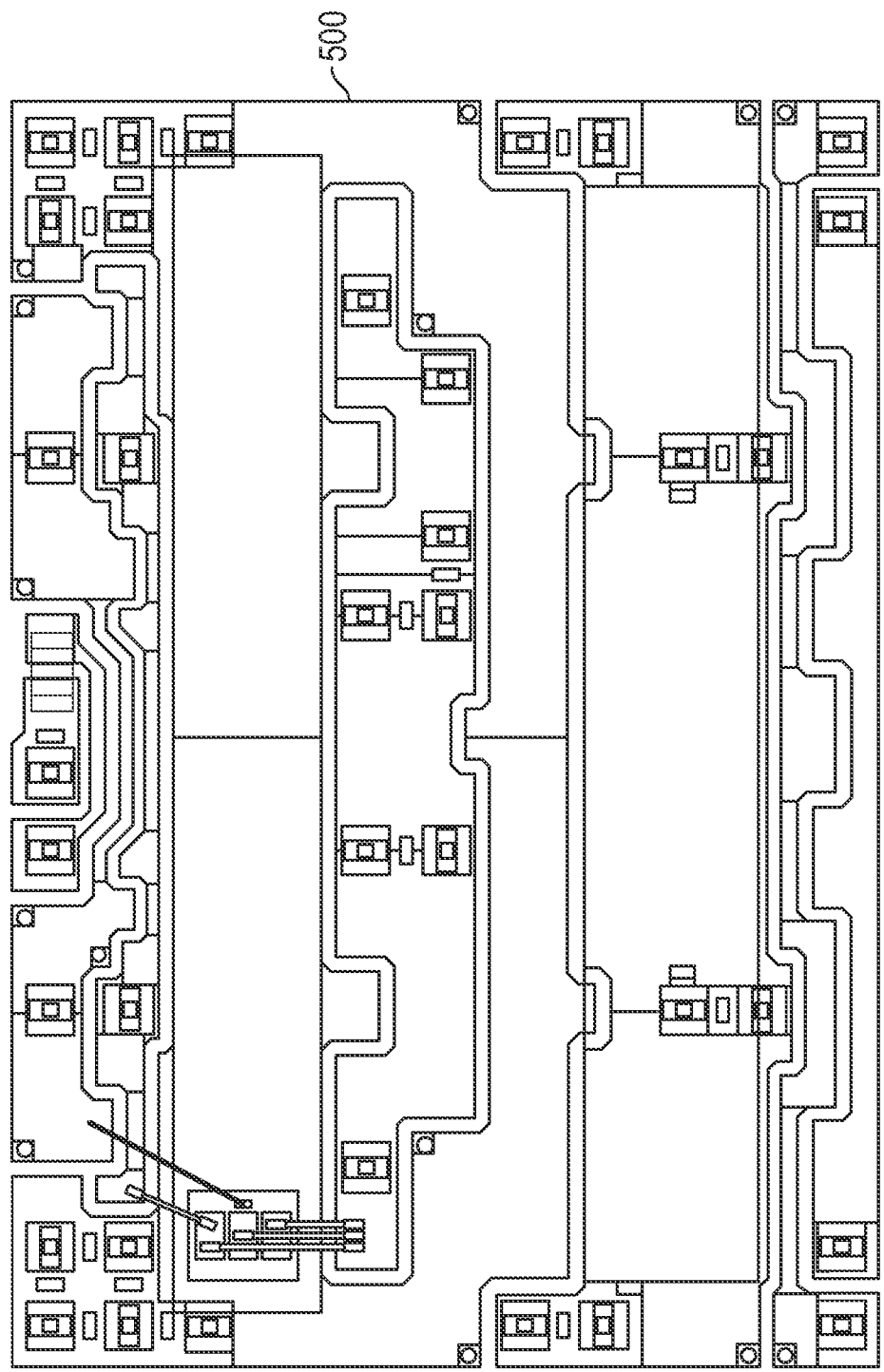
FIG. 5 illustrates a portion of a first interface that shows a module bonding diagram of the substrate of FIG. 3 following generation of a module bonding diagram.
Figure 8:
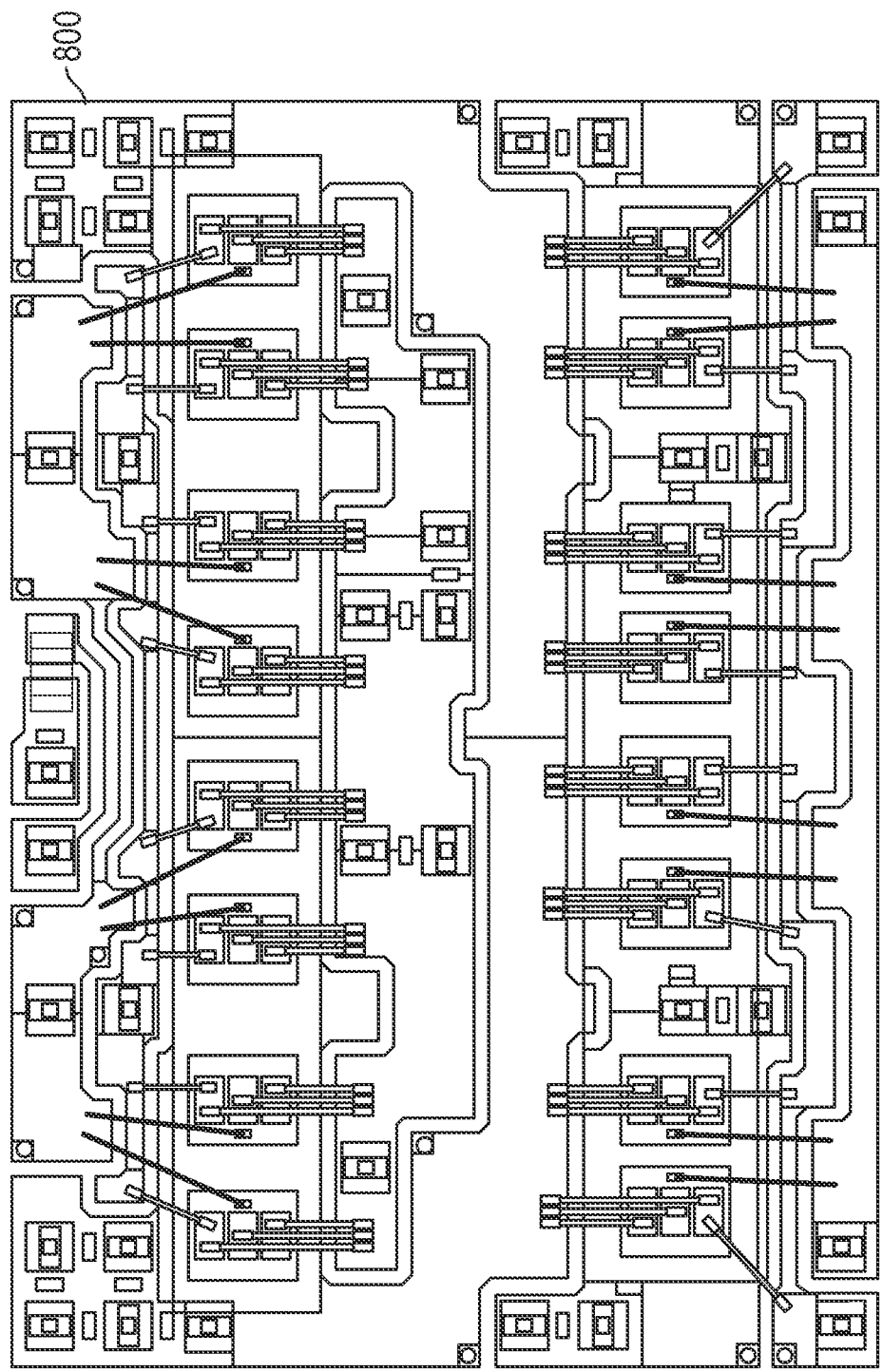
FIG. 8 illustrates a portion of a first interface shows a module bonding diagram for the substrate of FIG. 7.

Bonding generating module 112 generates, using a processor, a two-dimensional (2D) module bonding diagram using a build diagram system module with the module configuration file. FIGS. 5 and 8 illustrate a view of a substrate 500, 800 in the first interface following generating of the module bonding diagram. As illustrated, the formal placement of each wire, pin, and die has been constructed by the build system diagram module using the module configuration file and the resulting output is now ready for further use in simulations. In various implementations, the module bonding diagram may be preliminary and may subsequently be adjusted by a user for a particular wire bonder or clip configuration or other tool processing requirement as part of production implementation. However, for the purposes of further design and simulation of the module, the module bonding diagram may be sufficiently accurate to allow for real simulation and product performance characteristics to be calculated as the changes needed in production may be only nominal for the bonding to be carried out. In those implementations where the module is a dual side cooling module, the 2D module bonding diagram may include multiple layers to account for each of the 2 or more direct bonded copper substrates included in the dual side cooling module.

During the process where the user uses the first interface to select and place die, the system uses SPICE model selection module 114 to select, using a processor, one or more SPICE models corresponding with the one or more die. In various system implementations, during selection of one or more die by the user may further include using the first interface to retrieve a die SPICE model from a die SPICE modeling system. The die SPICE modeling system may include a database of die SPICE models that have been previously generated by a system that employs a technology computer aided design (TCAD) module that uses a wide variety of computer aided modeling techniques to create the product spice model such as, by non-limiting example, a finite element modeling process, electrical simulations, deep learning techniques, neural networks, engineering calculations numerical methods, any combination of the foregoing, and any other engineering modeling technique, to generate the product SPICE model of each die.

In various system implementations, the first interface may include components that allow the user to select various variation limits for one, any, or all of the electrical parameters associated with a die and/or module. By non-limiting example, these variation limits may be set using the interface to select a minimum or a maximum allowed amount of variation for a particular parameter. In the interface, this selection may be done using a checkbox element. In various implementations, these variation limits may be referred to as corner limits. Non-limiting examples of electrical parameters that may employ corner limits may be threshold voltage (Vth), RDSon, capacitance, or Qg or any other or any other electrical parameter of the die/module in various system and method implementations. For module products, the ability to utilize corner limits/models may be particularly important because the various die in the module may not be all operating at the same process conditions during the operation of the module. In various implementations of, each die may be operating in an uncorrelated manner to the operation of each other die in the module. The ability to utilize corner limits/models may allow the user to make a module more robust to die specific failures during the development/simulation process. During system operation, the corner limits are used in the formation of the product SPICE model as the system simulates the corner limits by adjusting internal process parameters in the SPICE model(s) used by the system to create the product SPICE model. The resulting product SPICE model's ability to predict product performance is accordingly extended within the range of the corner limits. This adjusted product SPICE model then can be used by the product simulation module 122 as described hereafter to provide datasheet characteristics that show typical performance as well as performance according to the amount of particular corner limit for a given electrical parameter. These datasheet characteristics can then be included in a datasheet associated with the module semiconductor product using the processes and systems disclosed hereafter.

Following completion of the generation of the module bonding diagram, configuration file providing module 116 provides, using a processor, the module configuration file, the module bonding diagram, and the one or more die SPICE models to a three dimensional simulation module 118. In various system and method implementations, the three dimensional simulation module 118 can perform a variety of operations in a wide variety of orderings. While particular orderings of operations are disclosed in this document, these are merely for the exemplary purposes of this disclosure. For example, in a particular implementation, the three dimensional simulation model 118 may receive the two-dimensional module bonding diagram and a schematic showing the electrical connections between the various devices in the module, conduct three-dimensional modeling, then finite element method modeling and then SPICE model integration and generation into a product SPICE model. This is serial order of operations uses the results of each step to enable performing each other step. In other implementations however, one or more of these operations may be performed in a different order or in parallel with the other operations. However in various implementations disclosed in this document the various three-dimensional related operations are carried out by the three-dimensional simulation module 118. In various implementations, separate modules for each operation may be employed, but in this document these modules are grouped together and referred to as the three-dimensional simulation module.

Figure 10:
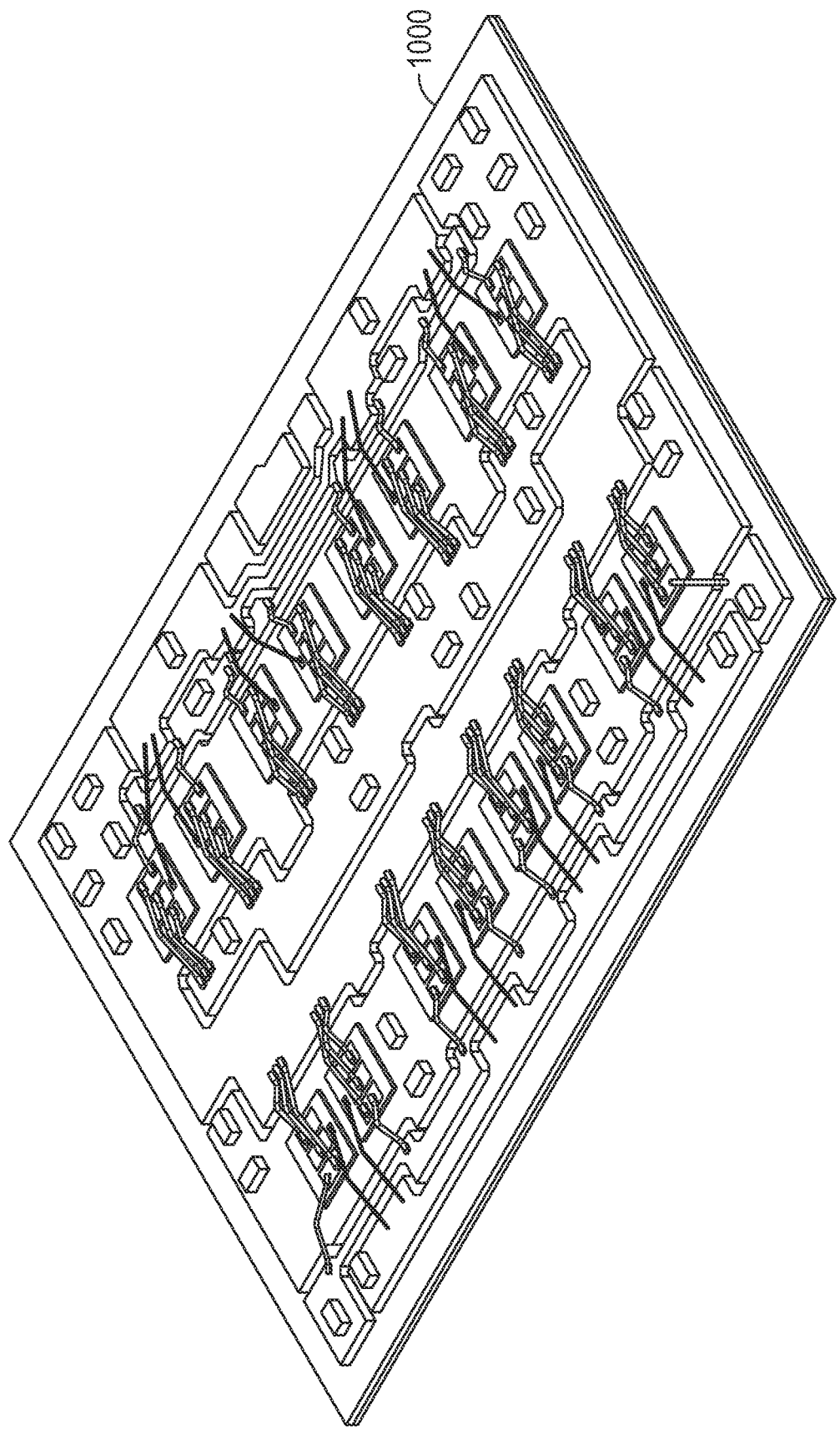
FIG. 10 illustrates an implementation of a three-dimensional model generated by a three-dimensional simulation module.

In particular implementations, the three dimensional simulation module 118 first generates a three-dimensional model for the module semiconductor product. In generating the three-dimensional model, the three-dimensional simulation module 118 may employ Python or another scripting language to generate the three-dimensional model from the JSON file created by the bonding generating module 112 (using the 2D bonding diagram). In particular implementations, the three-dimensional model generation may be carried out using the simulation package marketed under the tradename SPACECLAIM by Ansys Inc of Canonsburg, Pa. Referring to FIG. 10, a perspective view of an implementation of a three-dimensional model 1000 of a module product following three-dimensional modeling is illustrated. The detail view of the corner of the model 1000 illustrated in FIG. 11 shows how the three-dimensional simulation module 118 took the inputs from the module bonding diagram to three-dimensional model each of the bondwires 1002, 1004 down to the different wire thicknesses of the wires. In various implementations, the three-dimensional model may be provided to the user in either of the first interface or a $2^{nd}$ interface in the form of a three-dimensional computer aided drawing (CAD) file format such as, by non-limiting example, an Initial Graphics Exchange (IGS) format, a Standard for the Exchange of Product model data (STEP) format, or any other computer aided drawing file format.

In particular implementations, the three-dimensional simulation model 118 then takes the three-dimensional model and the module bonding diagram and performs a finite element method (FEM) simulation of various parasitic and thermal aspects presented by the three-dimensional model and the bonding implementation described in the module bonding diagram. In various implementations, the parasitics simulation may be carried out by the three dimensional simulation module using the simulation package marketed under the tradename Q3D by Ansys, Inc. of Canonsburg, Pa. In various implementations, the three-dimensional simulation model 118 performs solid and simulation modeling and modeling of electrical parasitics to form a parasitic network SPICE model. In various parasitic extraction modeling implementations, the modeling may include direct current (DC) self and mutual resistance modeling to capture static electrical conduction losses and alternating current (AC) self and mutual inductance and capacitance modeling to capture dynamic electrical behavior.

Following FEM simulation, in various implementations, the three dimensional simulation module 118 may employ the simulation package marketed under the tradename ICEPAK by Ansys, Inc. to generate a thermal model for the module being designed. During thermal modeling, in various implementations the thermal power to be dissipated for each die may be retrieved from modeling data for each die previously determined by a discrete or die device product modeling system stored in a database. Thermal modeling may include transient sweep analysis for determining step response curves and setting various boundary conditions for use by the models (fixed temperatures, thermal resistances, heat transfer coefficients, etc.). The thermal modeling is summarized in a thermal SPICE model constructed using a distributed, coupled electro-thermal modeling approach employing a Cauer or Foster network synthesis process.

In various implementations, the calling of the various modeling components carried out within the three dimensional simulation model may be done using scripting and other batch automation techniques. Following all of the modeling carried out by the three-dimensional simulation module 118, the three-dimensional simulation module 118 may then generate the product SPICE model. In various implementations, the generation of the product spice model from the die, parasitic, and thermal models may be done using scripting and other batch automation techniques. By way of non-limiting example, the product SPICE model (overall) may include die SPICE models, a module parasitic extraction model/SPICE model, and a thermal model/SPICE model. The product SPICE model in particular implementations includes PORT definitions, a top level subcircuit, die SPICE models, a Q3D model, a thermal model, and schematic symbols. The resulting product SPICE model may be generated with a SPICE agnostic syntax such that any commercial SPICE simulator can be supported. Non-limiting example of commercial SPICE simulators may include the simulator marketed under the tradename PSPICE by Cadence Design Systems; the simulator marketed under the tradename LTSPICE by Analog Devices of Norwood Mass.; the simulator marketed under the tradename HSPICE by Synopsys, Inc. of Mountain View, Calif.; the simulator marketed under the tradename ELDO by Mentor Graphics of Wilsonville, Oreg.; the simulator marketed under the tradename SIMETRIX by SlMetrix Technologies LTD of Berkshire, UK; the simulator marketed under the tradename SPECTRE by Cadence Design Systems; the simulator marketed under the tradename ADS by Keysight Technologies Inc. of Santa Rosa, Calif.; the simulator marketed under the tradename SABER by Synopsys, Inc.; the simulator marketed under the tradename SIMPLORER by Ansys, Inc. of Canonsburg, Pa.; or the simulator marketed under the tradename MICROCAP by Spectrum Software. After generation, the product SPICE model may also, in some implementations, be transmitted for inclusion in a database of product SPICE models for later selection by a user.

Following transmission of at least the product SPICE model to product simulation module, the product simulation module 122 generates, using a processor, one or more datasheet characteristics of the module semiconductor product with at least the product SPICE model. In particular implementations, the product simulation module 122 may utilize, by non-limiting example, ELDO or SIMETRIX or any other SPICE simulator disclosed in this document. By way of non-limiting example, the one or more datasheet characteristics may include maximum rating, thermal characteristics, or module outline. By way of non-limiting example, the one or more datasheet characteristics may include a module performance graph, a module pinout, or a product specification. Any of the various characteristics of the module (thermal, electrical, performance, mechanical, etc.) desired for disclosure in a datasheet may be simulated in various implementations. Non-limiting examples of datasheet characteristics that may be simulated may be current-voltage, RDSon, VCEsat, forward diode voltage, leakage currents, breakdown voltage, threshold voltage, capacitance, gate charge, energy losses, switching times, reverse recovery, thermal resistance and impedance, or safe operating area characteristics or any other module parameter. Following the generation of the one or more datasheet characteristics, datasheet characteristic providing module 124 provides, using a processor, the one or more datasheet characteristics to a product datasheet formation module.

Product datasheet formation module 126 generates, using a processor, a product datasheet for the module semiconductor product with at least the module configuration file, the module bonding diagram, and the one or more datasheet characteristics. In various implementations the datasheet formation module 128 employs the document preparation system marketed the tradename LATEX by The LATEX Project. However, in other implementations, the data sheet formation module 128 may use many other document preparation systems, data formats, typefaces, and fonts as desired to generate the datasheet. In various implementations, the datasheet characteristics may be included in the product datasheet in tabular and/or plot formats. In various implementations, generating the module bonding diagram using the build diagram system module may include using a plurality of bonding design rules with the module configuration file. For example, a design rule may specify a minimum distance between 2 wirebonds. The product datasheet may be automatically submitted for inclusion in a product datasheet database. In various implementations, the product datasheet may be created in various implementations on the basis of the simulation results; several product datasheet revisions may be created using the simulation results later after further review; or, depending on the review/evaluation process, the product datasheet may be released after an actual module product has been physically built and tested.

Figure 9:
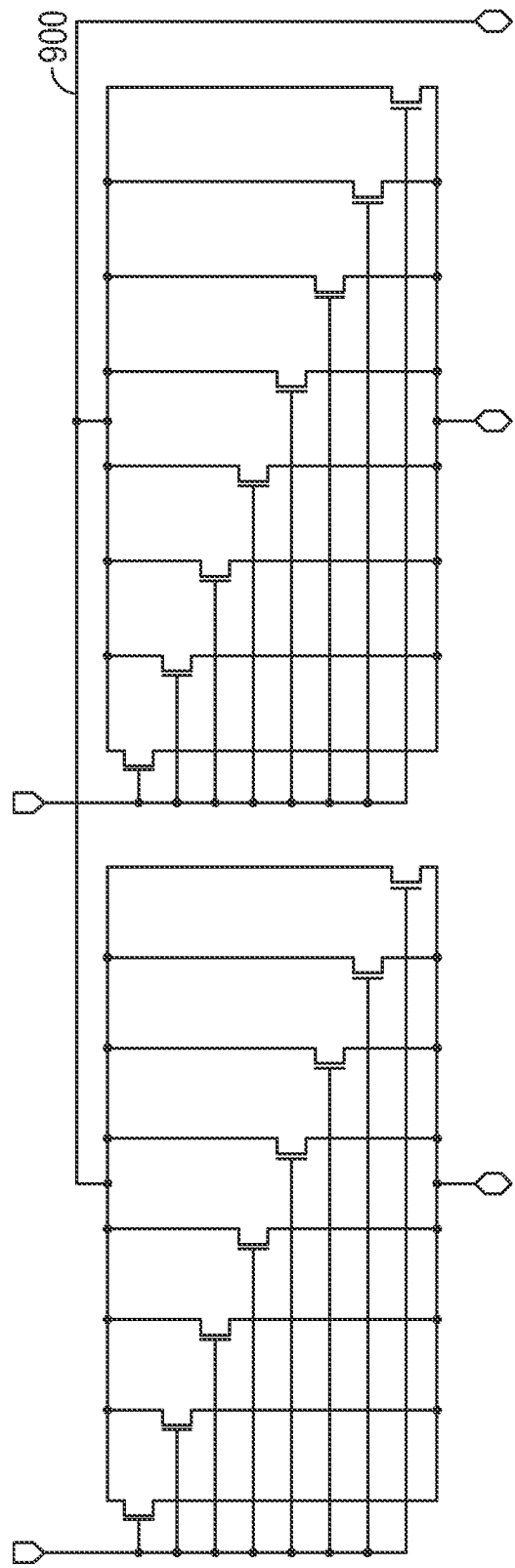
FIG. 9 illustrates an implementation of a module electrical schematic generated by the system.

Access providing module 128 may be configured to provide access to at least the module bonding diagram, the product SPICE model, the three dimensional model, and the product datasheet. By way of non-limiting example, the access providing module 128 and/or a separate computing device may generate a second interface on the computing device that allows the user to access module bonding diagram, the product SPICE model, the three dimensional model, and the product datasheet. By way of non-limiting example, in various implementations, the second interface may also provide access to a module schematic diagram in addition to the other module information. Referring to FIG. 9, an implementation of such a module schematic diagram is illustrated. In various implementations, the purpose of the module schematic diagram is to allow the user to review the overall electrical structure of the module following placement of all the wires and pins and die to ensure that the resulting circuit design is as desired and all of the needed routing and connections actually were made in the process. In various implementations, the generation of the modules committed diagram may be done using scripting and other batch automation techniques. This module schematic diagram may be provided in the second interface in some implementations, or may be provided in the first interface following completion of generating the module configuration file. In various implementations, the second interface may provide access to the various diagrams and models by providing links in the interface that allow the user to download corresponding files. In some implementations, the links may be permit encrypted and unencrypted versions of the files to be downloaded by the user using the computing device.

In some implementations, computing platform(s) 102, remote platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 130 may be operatively linked via some other communication media.

A given remote platform 104 may include one or more processors configured to execute computer program modules. The computer program modules may be configured to enable an expert or user associated with the given remote platform 104 to interface with system 100 and/or external resources 130, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Computing platform(s) 102 may include electronic storage 132, one or more processors 134, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 132 may comprise non-transitory storage media that electronically stores information. The electronic storage media of electronic storage 132 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from computing platform(s) 102, information received from remote platform(s) 104, and/or other information that enables computing platform(s) 102 to function as described herein.

Processor(s) 134 may be configured to provide information processing capabilities in computing platform(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute modules 108, 110, 112, 114, 116, 118, 122, 124, 126, and/or 128, and/or other modules. Processor(s) 134 may be configured to execute modules 108, 110, 112, 114, 116, 118, 122, 124, 126, and/or 128, and/or other modules by software; hardware; firmware; some combination of software, hardware, and/or firmware; and/or other mechanisms for configuring processing capabilities on processor(s) 134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 122, 124, 126, and/or 128 are illustrated in FIG. 1 as being implemented within a single processing unit, in implementations in which processor(s) 134 includes multiple processing units, one or more of modules 108, 110, 112, 114, 116, 118, 122, 124, 126, and/or 128 may be implemented remotely from the other modules. The description of the functionality provided by the different modules 108, 110, 112, 114, 116, 118, 122, 124, 126, and/or 128 described below is for illustrative purposes, and is not intended to be limiting, as any of modules 108, 110, 112, 114, 116, 118, 122, 124, 126, and/or 128 may provide more or less functionality than is described. For example, one or more of modules 108, 110, 112, 114, 116, 118, 122, 124, 126, and/or 128 may be eliminated, and some or all of its functionality may be provided by other ones of modules 108, 110, 112, 114, 116, 118, 122, 124, 126, and/or 128. As another example, processor(s) 134 may be configured to execute one or more additional modules that may perform some or all of the functionality attributed below to one of modules 108, 110, 112, 114, 116, 118, 122, 124, 126, and/or 128.

Figure 2A:
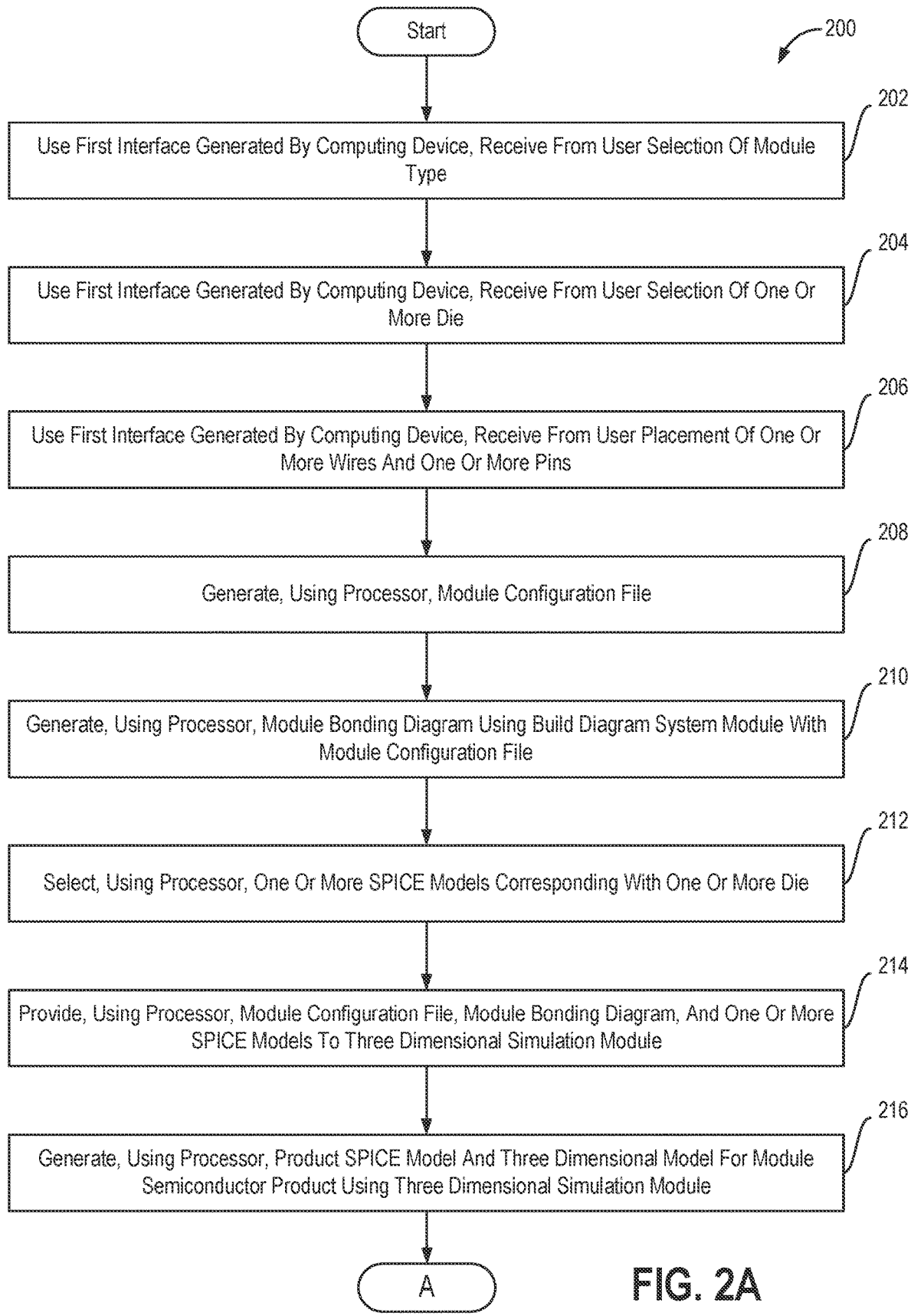
FIG. 2A illustrates a first portion of a flowchart of a method for designing a module semiconductor product.
Figure 2B:
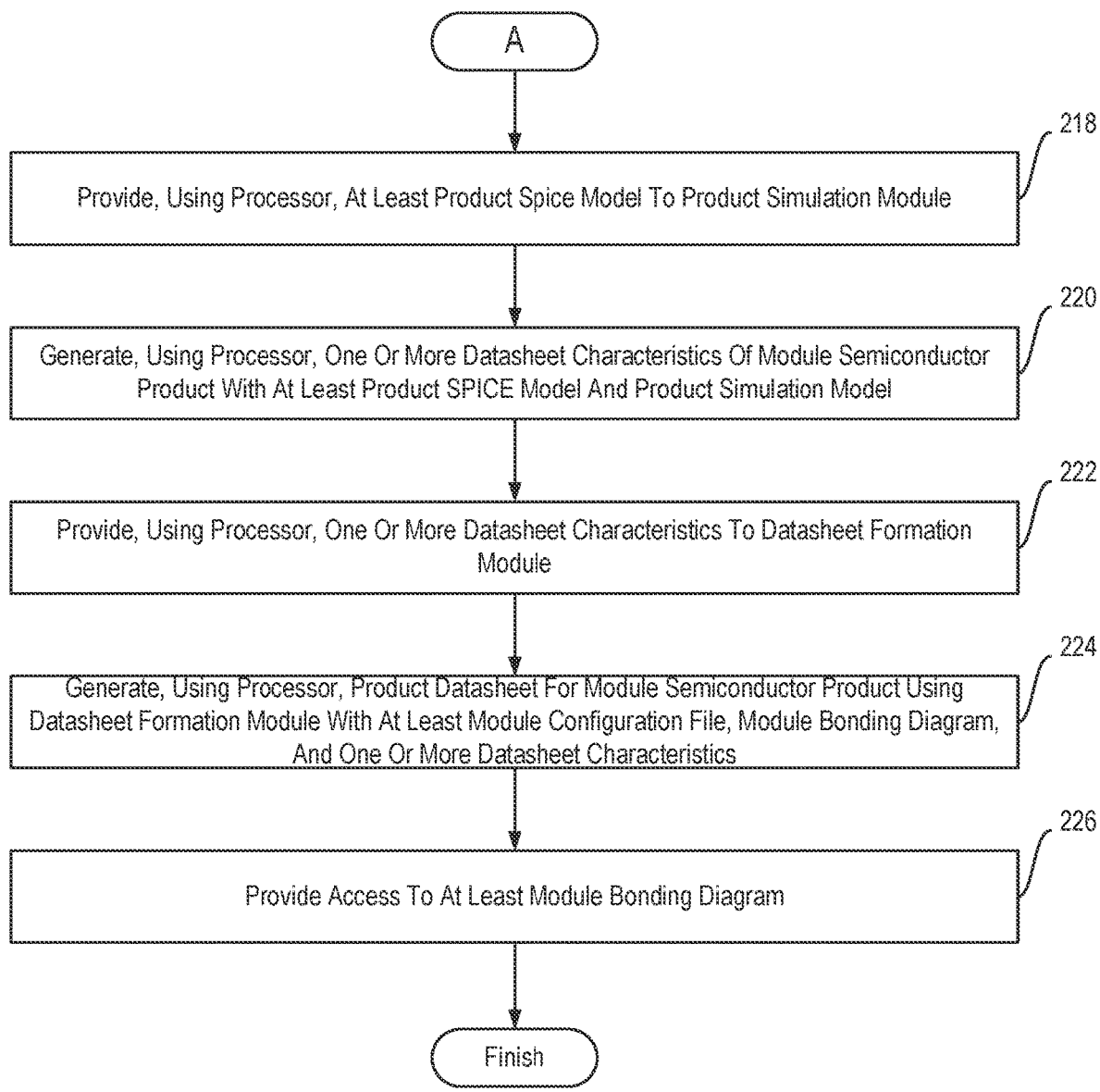
FIG. 2B illustrates a second portion of a flowchart of a method for designing a module semiconductor product.

FIGS. 2A and 2B illustrate a flowchart of an implementation of a method 200 for designing a module semiconductor product. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A and 2B described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include using a first interface generated by a computing device, receiving from a user a selection of a module type. Operation 202 may be performed by one or more hardware processors configured by machine-readable instructions including a module that is the same as or similar to interface using module 108, in accordance with one or more implementations.

An operation 204 may include using a first interface generated by a computing device, receiving from a user a selection of one or more die. Operation 204 may be performed by one or more hardware processors configured by machine-readable instructions including a module that is the same as or similar to interface using module 108, in accordance with one or more implementations.

An operation 206 may include using a first interface generated by a computing device, receiving from a user a placement of one or more wires, one or more clips, and/or one or more pins. Operation 206 may be performed by one or more hardware processors configured by machine-readable instructions including a module that is the same as or similar to interface using module 108, in accordance with one or more implementations.

An operation 208 may include generating, using a processor, a module configuration file. Operation 208 may be performed by one or more hardware processors configured by machine-readable instructions including a module that is the same as or similar to configuration generating module 110, in accordance with one or more implementations.

An operation 210 may include generating, using a processor, a module bonding diagram using a build diagram system module with the module configuration file. Operation 210 may be performed by one or more hardware processors configured by machine-readable instructions including a module that is the same as or similar to bonding generating module 112, in accordance with one or more implementations.

An operation 212 may include selecting, using a processor, one or more SPICE models corresponding with the one or more die. Operation 212 may be performed by one or more hardware processors configured by machine-readable instructions including a module that is the same as or similar to SPICE model selection module 114, in accordance with one or more implementations.

An operation 214 may include providing, using a processor, the module configuration file, the module bonding diagram, and the one or more SPICE models to a three dimensional simulation module. Operation 214 may be performed by one or more hardware processors configured by machine-readable instructions including a module that is the same as or similar to configuration file providing module 116, in accordance with one or more implementations.

An operation 216 may include generating, using a processor, a product SPICE model and a three dimensional model for the module semiconductor product using the three dimensional simulation module. The three dimensional simulation module may carry out any of the various simulation operations disclosed herein serially or in parallel in various implementations. Operation 216 may be performed by one or more hardware processors configured by machine-readable instructions including a module that is the same as or similar to three dimensional simulation module 118, in accordance with one or more implementations.

An operation 218 may include providing, using a processor, at least the product SPICE model to a product simulation module 122. Operation 218 may be performed by one or more hardware processors configured by machine-readable instructions including a module that is the same as or similar to three dimensional simulation module 118, in accordance with one or more implementations.

An operation 220 may include generating, using a processor, one or more datasheet characteristics of the module semiconductor product with at least the product SPICE model and the product simulation module 122. Operation 220 may be performed by one or more hardware processors configured by machine-readable instructions including a module that is the same as or similar to product simulation module 122, in accordance with one or more implementations.

An operation 222 may include providing, using a processor, the one or more datasheet characteristics to a datasheet formation module. Operation 222 may be performed by one or more hardware processors configured by machine-readable instructions including a module that is the same as or similar to product simulation module 122, in accordance with one or more implementations.

An operation 224 may include generating, using a processor, an product datasheet for the module semiconductor product using the datasheet formation module with at least the module configuration file, the module bonding diagram, and the one or more datasheet characteristics. Operation 224 may be performed by one or more hardware processors configured by machine-readable instructions including a module that is the same as or similar to product datasheet formation module 126, in accordance with one or more implementations.

An operation 226 may include providing access to at least the module bonding diagram, the product SPICE model, the three dimensional model, and the product datasheet to the user via a second interface with the computing device. Operation 226 may be performed by one or more hardware processors configured by machine-readable instructions including a module that is the same as or similar to access providing module 128, in accordance with one or more implementations.

In places where the description above refers to particular implementations for designing a module semiconductor product and implementing components, sub-components, methods and sub-methods, it should be readily apparent that a number of modifications may be made without departing from the spirit thereof and that these implementations, implementing components, sub-components, methods and sub-methods may be applied to other techniques for designing a module semiconductor product.

What is claimed is:

1. A system configured for designing a multi-chip module, the system comprising:
   one or more hardware processors configured by machine-readable instructions to:
   use a first interface generated by a computing device to receive from a user a selection of a multi-chip module type;
   use the first interface to receive from the user a selection of two or more die;
   generate, using a processor, a module configuration file;
   generate, using the processor, a module bonding diagram using a build diagram system module with the module configuration file;
   select, using the processor, one or more SPICE models corresponding with the two or more die;
   provide, using the processor, the module configuration file, the module bonding diagram, and the one or more SPICE models to a three dimensional simulation module;
   generate, using the processor, a product SPICE model that includes module packaging and generate, using the processor, a three dimensional model for the multi-chip module using the three dimensional simulation module; and
   provide access to at least the module bonding diagram, the product SPICE model including module packaging, and the three dimensional model to the user by generating a second interface with the computing device.

2. The system of claim 1, wherein the product SPICE model including module packaging comprises die SPICE models, a module packaging parasitic extraction model, and a thermal model including the module packaging.

3. The system of claim 1, wherein the two or more die are power semiconductor die.

4. The system of claim 1, wherein the module configuration file is a Java Script Object Notation file.

5. The system of claim 1, wherein the three dimensional simulation module uses a finite element modeling process to generate the product SPICE model including module packaging of the multi-chip module.

6. The system of claim 1, wherein the system is configured to, after receiving from the user the selection of two or more die, retrieve a die SPICE model from a die SPICE modeling system.

7. The system of claim 1, wherein the system is configured to, after receiving from the user a placement of one or more wires, use a processor to use one or more design rules to generate flight lines for the one or more wires in the first interface.

8. The system of claim 1, wherein the system is configured to, after receiving from the user a placement of one or more pins, use a processor to indicate an acceptable location for the one or more pins in the first interface.

9. The system of claim 1, wherein the system is configured to use a plurality of bonding design rules with the module configuration file.

10. The system of claim 1, wherein the system is configured to provide access to a module schematic diagram with the second interface.

11. A method of designing a module semiconductor product, the method comprising:
 using a first interface generated by a computing device, receiving from a user a selection of a multi-die module type;
 using the first interface, receiving from the user a selection of two or more die;
  generating, using a processor, a module configuration file;
 generating, using the processor, a module bonding diagram using a build diagram system module with the module configuration file;
 selecting, using the processor, one or more SPICE models corresponding with the two or more die;
 providing, using the processor, the module configuration file, the module bonding diagram, and the one or more SPICE models to a three dimensional simulation module;
 generating, using the processor, a product SPICE model including module packaging and generating a three dimensional model for the module semiconductor product using the three dimensional simulation module; and
 providing access to at least the module bonding diagram, the product SPICE model including module packaging, and the three dimensional model to the user by generating a second interface with the computing device.

12. The method of claim 11, wherein the product SPICE model including module packaging comprises die SPICE models, a module parasitic extraction model including packaging, and a thermal model including packaging.

13. The method of claim 11, wherein the two or more die are power semiconductor die.

14. The method of claim 11, wherein the module configuration file is a Java Script Object Notation file.

15. The method of claim 11, wherein the three dimensional simulation module uses a finite element modeling process to generate the product SPICE model including module packaging of the module semiconductor product.

16. The method of claim 11, wherein receiving from the user the selection of two or more die further comprises retrieving a die SPICE model from a die SPICE modeling system.

17. The method of claim 11, wherein receiving from the user a placement of one or more wires comprises, using a processor, using one or more design rules to generate flight lines for the one or more wires in the first interface.

18. The method of claim 11, wherein receiving from the user a placement of one or more pins comprises, using a processor, indicating an acceptable location for the one or more pins in the first interface.

19. The method of claim 11, wherein generating, using the processor, the module bonding diagram using the build diagram system module further comprises using a plurality of bonding design rules with the module configuration file.

20. The method of claim 11, wherein providing access to at least the module bonding diagram, the product SPICE model including module packaging, and the three dimensional model to the user by generating the second interface with the computing device further comprises providing access to a module schematic diagram.

* * * * *